United States Patent Office 2,798,248
Patented July 9, 1957

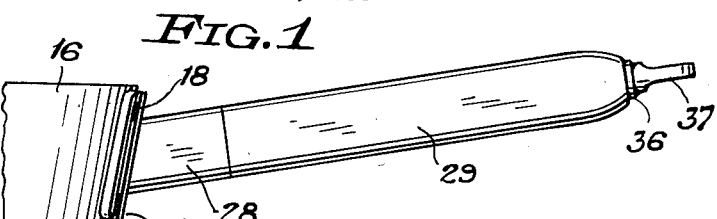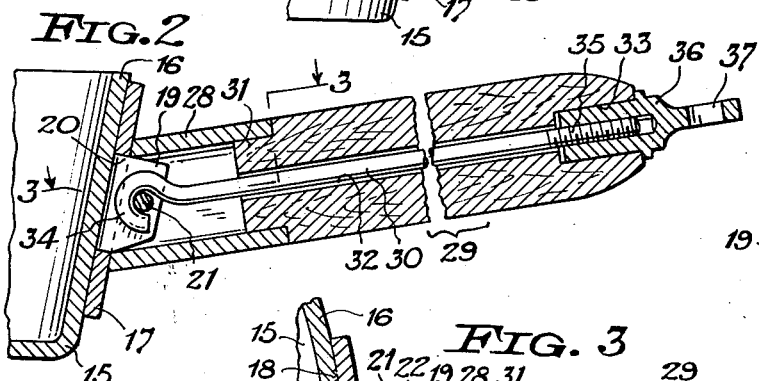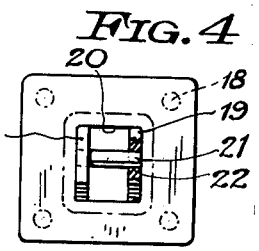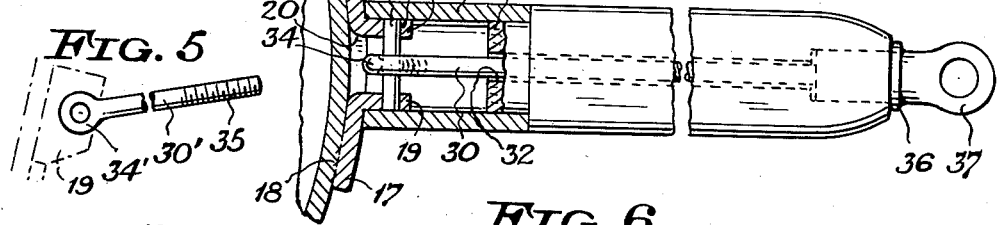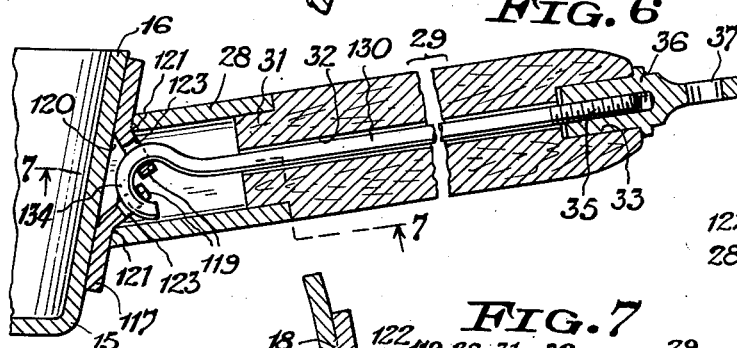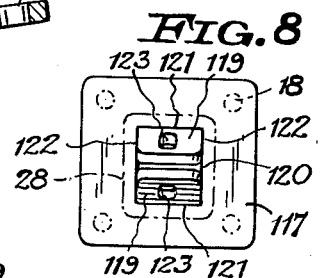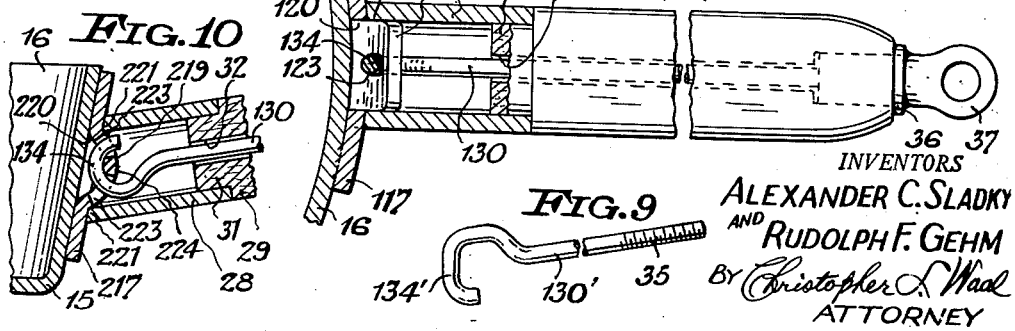

2,798,248

HANDLE STRUCTURE FOR UTENSILS

Alexander C. Sladky, Ellison Bay, and Rudolph F. Gehm, Kewaunee, Wis., assignors to Leyse Aluminum Company, Kewaunee, Wis., a corporation of Wisconsin Application October 18, 1954, Serial No. 462,672

2 Claims. (Cl. 16—110)

The present invention relates to handles for cooking utensils and the like.

An object of the invention is to provide an improved handle which is capable of easy assembly and attachment to a utensil, which is of strong, rugged and inexpensive construction, and which is neat in appearance and readily cleaned.

Another object is to provide a handle assembly including novel means for attaching a handle-clamping rod and positioning handle-forming parts.

The invention further consists in the several features hereinafter described and claimed.

In the accompanying drawings, illustrating certain embodiments of the invention, Fig. 1 is a side elevational view of a handle of the invention attached to a utensil;

Fig. 2 is a longitudinal vertical sectional view of the attached handle;

Fig. 3 is a top view of the attached handle, parts being shown in section along the line 3—3 of Fig. 2;

Fig. 4 is a front elevational view of a mounting plate for the handle, parts being shown in section;

Fig. 5 is a fragmentary detail view of a modified form of handle-clamping rod;

Fig. 6 is a sectional view similar to Fig. 2, showing a modified form of handle;

Fig. 7 is a bottom view of the handle of Fig. 6, parts being shown in section along the line 7—7 of Fig. 6;

Fig. 8 is a front elevational view of a mounting plate for the handle of Fig. 6;

Fig. 9 is a fragmentary detail view of a modified form of clamping rod for the handle of Fig. 6, and Fig. 10 is a fragmentary longitudinal sectional view of another modified form of handle.

Referring to the form of the invention shown in Figs. 1 to 4, 15 designates a metallic container or vessel having a side wall 16. By way of example, the container may be a frying pan or sauce pan formed of sheet aluminum alloy.

A mounting plate 17, such as of sheet aluminum alloy, is suitably secured to the outer face of the utensil side wall 16, as by spot welding 18 or by riveting, the plate being curved or bent to conform to the outer surface of the utensil side wall. Bent up from the middle region of the mounting plate to project from the face of the plate are two spaced parallel ears or tongues 19 of trapezoidal shape extending in vertical planes, the slitting of the plate for the formation of the ears leaving a rectangular opening 20 in the mounting plate, and the ears being formed in one or more operations. The upper edges of the ears extend at about right angles to the mounting plate, while the lower edges of the ears are cut on a bias. The ears are connected by a horizontal cross member 21, preferably consisting of a cross pin fitting in aligned openings or apertures 22 in the ears. The openings 22 are drilled or punched in the plate before the slitting of the plate.

A spacer sleeve or ferrule 28 and a handle member or hand grip 29 aligned therewith are secured to the mounting plate by a clamping rod or bolt 30, as hereinafter described, the sleeve being interposed between the hand grip and the mounting plate.

The sleeve 28, which is of rectangular or other non-circular cross-section, is positioned and held against rotation by the mounting plate ears 19, these ears extending into the inner end portion of the sleeve and having a height and spacing to fit within the sleeve. The inner end of the sleeve abuts and fits against the outer face of the mounting plate about the opening 20 and is here shown to be cut or formed on a bias to place the handle at a suitable inclination. The sleeve is made of any suitable metal such as aluminum or stainless steel.

The handle member or hand grip 29, which is preferably made of Bakelite, wood, or other suitable non-metallic material, has a reduced shouldered inner end 31 of non-circular shape fitting in the adjacent end of the sleeve 28 against relative rotation and abutting against the end face of the sleeve. The hand grip has formed longitudinally therethrough a bore 32 which receives the clamping rod 30, the bore having a counterbore 33 at its outer end.

The clamping rod 30, which is preferably made of steel, is formed at its inner end with a hooked or apertured portion 34 which is disposed between the mounting plate ears 19 and detachably engages and embraces the cross pin 21, the plate opening 20 providing clearance for the hooked portion. The rod is thus anchored on the mounting plate and is prevented from turning. The cross pin 21 may be pressed or riveted in place or may merely have a push fit or loose fit in the ear openings 22 since the opposite side walls of the sleeve 28 will prevent dislodgment of the pin after the handle is assembled. The outer end of the rod 30 has a screw-threaded portion 35 which is engaged by a flanged nut 36 of conventional type for detachably clamping the hand grip and sleeve in place, the nut being made of a suitable metal such as aluminum or stainless steel. The nut fits in the counterbore 33 of the hand grip and is provided at its outer end with a terminal eye 37 for turning the nut and for hanging the utensil.

In assembling the utensil, the mounting plate 17 is secured to the container side wall 16, as by the spot welding 18. The cross pin 21 is inserted in the openings 22 of the spaced mounting plate ears 19, either before or after the plate-securing operation. The hooked end 34 of the clamping rod 30 is then engaged over the cross pin 21, and the spacer sleeve 28 is passed over the rod and positioned over the mounting plate ears 19. The hand grip 29 is then slid over the rod into interengagement with the sleeve, and the nut 36 is engaged on the threaded outer end portion of the rod, thus securing the hand grip and sleeve firmly in place against rotation.

The modified form of handle-clamping rod 30' shown in Fig. 5 has a closed terminal eye 34' instead of an open hook. With this form of rod the cross pin 21 is inserted in the mounting plate ears after the eye 34' is placed between the ears. The terminal eye 34' may be formed by flattening the end of the rod and then drilling or piercing the flattened end.

The modified form of handle structure shown in Figs. 6 to 8 includes a mounting plate 117 secured to the utensil side wall, as by spot welding 18. Bent up from the middle region of the mounting plate are projecting parts in the form of upper and lower ears 119 of rectangular shape and equal width, the slitting of the plate during the formation of the ears leaving a rectangular opening 120 in the plate. Each ear 119 has a horizontal junction line 121 with the mounting plate and has opposite parallel side edges 122. The ears converge outwardly from the mounting plate an an angle of about 45° and are provided with respective openings 123 disposed in a central vertical plane.

The handle structure of Fig. 6 further includes a spacer sleeve 28 and hand grip 29, as in the device of Fig. 2, these parts being secured to the mounting plate by a clamping rod 130 generally similar to the rod 30 of Fig. 2 and engaged by a clamping nut 36.

The sleeve 28 is positioned and held against rotation by the mounting plate ears 119 which constitute a projecting portion, these ears extending into the inner end portion of the sleeve and having a width to fit within the sleeve. The parallel junctions 121 of the ears with the mounting plate are spaced to confine the upper and lower walls of the sleeve.

The clamping rod 130 is formed at its inner end with a hook 134 which extends in a vertical plane and is detachably engaged in the opening 123 of the mounting plate ears 119, the plate opening 120 providing clearance for the hook. The rod is thus anchored to the mounting plate and is prevented from turning. The ear openings 123 are offset from the longitudinal axis of the clamping rod and are arranged on opposite sides of this axis. The portions of the ears between the openings constitute a bearing section for the hook.

The handle structure of Fig. 6 is assembled in the same manner as that of Fig. 2 except that the terminal hook 134 of the clamping rod is passed through the two openings 123 of the base plate ears.

The modified form of handle-clamping rod 130' shown in Fig. 9 is similar to that of Fig. 6 except that the rod has a terminal hook 134' of angular shape.

The modified form of handle structure shown in Fig. 10 is generally similar to that of Fig. 6 and includes a mounting plate 217 having a projection ear-forming portion 219 of arched or outwardly converging shape and rectangular outline bent out from the plate and provided with a pair of spaced openings 223 disposed in a central vertical plane, the projecting portion having upper and lower junction lines 221 with the plate and opposite parallel side edges formed by slitting the plate. The formation of the projecting portion 219 leaves a rectangular opening or recess 220 in the plate. The spacer sleeve 28 fits over the projecting portion, as in Fig. 6, to position the sleeve and confine it against rotation, and the hand grip 29 and sleeve are held in assembled relation by the clamping rod 130, the terminal hook 134 of which extends in a vertical plane and is detachably engaged in the openings of apertures 223 of the projecting portion. The plate recess 220 provides clearance for the hook 134, and the hook bears on the section 224 of the projecting portion between the openings 223 and embraces this section. The bearing section 224 corresponds in function to the cross member 21 of Fig. 2 and is approximately in alignment with the straight portion of the clamping rod. The spaced hook-receiving openings 223 in Fig. 10 and the similar openings 123 in Fig. 6 limit the angular play of the clamping rod.

We claim:

1. In a utensil handle having a hand grip and a sleeve interposed between the hand grip and the utensil, a mounting plate adapted to be secured to the utensil and having a projecting sleeve-positioning portion extending into an end of the sleeve, said projecting portion including spaced ears formed on said mounting plate and fitting in said sleeve, and said projecting portion further including a bearing pin extending between said ears and having its opposite ends in said ears, said bearing pin being adapted to extend through an apertured end portion of a clamping rod extending through the hand grip.

2. In a utensil handle having a hand grip and a sleeve interposed between the hand grip and the utensil, a mounting plate adapted to be secured to the utensil and having a projecting sleeve-positioning portion extending into an end of the sleeve, said plate having an opening therethrough, and said projecting portion comprising sleeve-positioning ears integrally formed on said plate at opposite sides of said opening and fitting in said sleeve, a pin extending through said ears, said pin being adapted to receive an apertured end of a clamping rod extending through the hand grip.

References Cited in the file of this patent
UNITED STATES PATENTS

| | | |
|---|---|---|
| 2,521,463 | Kircher | Sept. 5, 1950 |
| 2,624,066 | Fry | Jan. 6, 1953 |
| 2,638,370 | Price | May 12, 1953 |